United States Patent
Schaber (10) Patent No.: US 8,783,623 B2
(45) Date of Patent: Jul. 22, 2014

(54) DEVICE FOR THE GENERATION OF AERODYNAMIC VORTICES AND ALSO A REGULATING FLAP AND WING WITH A DEVICE FOR THE GENERATION OF AERODYNAMIC VORTICES

(75) Inventor: Sven Schaber, Schwanewede/Leuchtenburg (DE)

(73) Assignee: Airbus Operations GmbH, Hamburg (DE)

( * ) Notice: Subject to any disclaimer, the term of this patent is extended or adjusted under 35 U.S.C. 154(b) by 464 days.

(21) Appl. No.: 12/997,135

(22) PCT Filed: Jun. 10, 2009

(86) PCT No.: PCT/EP2009/004207
§ 371 (c)(1),
(2), (4) Date: Dec. 9, 2010

(87) PCT Pub. No.: WO2009/149932
PCT Pub. Date: Dec. 17, 2009

(65) Prior Publication Data
US 2011/0101169 A1 May 5, 2011

Related U.S. Application Data

(60) Provisional application No. 61/060,210, filed on Jun. 10, 2008.

(30) Foreign Application Priority Data

Jun. 10, 2008 (DE) .......................... 10 2008 027 618

(51) Int. Cl.
| | | |
|---|---|---|
| B64C 9/34 | (2006.01) | |
| B64C 9/06 | (2006.01) | |
| B64C 9/08 | (2006.01) | |
| B64C 23/06 | (2006.01) | |

(52) U.S. Cl.
USPC .................. 244/199.3; 244/99.2; 244/199.4; 244/206

(58) Field of Classification Search
USPC ............... 244/46, 199.2, 199.3, 199.4, 204.1, 244/206, 218, 99.2; 416/55, 87
See application file for complete search history.

(56) References Cited

U.S. PATENT DOCUMENTS 1,466,551 A 8/1923 Thurston
1,888,418 A * 11/1932 Adams .......................... 244/218

(Continued)

FOREIGN PATENT DOCUMENTS

| CA | 2136000 A1 | 10/1994 |
|---|---|---|
| CN | 1845848 A | 10/2006 |
| CN | 1953900 A | 4/2007 |
| DE | 403173 C | 9/1924 |
| DE | 19706668 A1 | 9/1998 |
| DE | 10020177 A1 | 11/2001 |
| DE | 10052022 A1 | 5/2002 |
| DE | 10313290 A1 | 10/2004 |
| EP | 0642440 B1 | 3/1995 |
| GB | 565634 A | 11/1944 |
| WO | 9422713 A | 10/1994 |
| WO | 03000547 A1 | 1/2003 |

OTHER PUBLICATIONS

International Search Report for corresponding PCT Application PCT/EP2009/004207, dated May 7, 2010.
International Preliminary Report on Patentability for corresponding PCT Application PCT/EP2009/004207, dated Jan. 11, 2011.
Office Action for corresponding CN Application No. 200980121835, dated Jan. 30, 2013.

*Primary Examiner* — Rob Swiatek
(74) *Attorney, Agent, or Firm* — Ingrassia Fisher & Lorenz P.C.

(57) ABSTRACT

A device for the generation of aerodynamic vortices to be arranged on the spanwise side edge of a wing, or a regulating flap adjustably arranged on the latter, which in each case have a chordwise direction and a spanwise direction, wherein the device is formed from one aerofoil component or from a plurality of aerofoil components, wherein the at least one aerofoil component is designed as a part that can be moved relative to the wing or regulating flap in its spanwise direction, wherein the device for vortex generation has an actuation device for the retraction and extension of the aerofoil components into a recess, and also a drive device to operate the actuation device. A regulating flap of a wing, and also a wing, with such a device for the generation of aerodynamic vortices, and a wing, which has at least two aerofoil segments at its side edge situated at the spanwise end.

18 Claims, 5 Drawing Sheets

(56) References Cited

U.S. PATENT DOCUMENTS

| | | |
|---|---|---|
| 3,596,854 A | 8/1971 | Haney, Jr. |
| 4,132,375 A | 1/1979 | Lamar |
| 4,671,473 A | 6/1987 | Goodson |
| 4,756,270 A | 7/1988 | Boscov |
| 5,823,480 A | 10/1998 | La Roche |
| 6,491,260 B2 | 12/2002 | Borchers et al. |
| 6,578,798 B1 | 6/2003 | Dizdarevic |
| 7,100,875 B2 | 9/2006 | Shmilovich et al. |
| 7,597,285 B2 | 10/2009 | Schweiger |
| 2001/0032907 A1 | 10/2001 | Borchers |
| 2004/0155157 A1 | 8/2004 | Bray |
| 2005/0184196 A1 | 8/2005 | Shmilovich et al. |
| 2006/0049307 A1 | 3/2006 | Schweiger |
| 2007/0262205 A1 | 11/2007 | Grant |

\* cited by examiner

DEVICE FOR THE GENERATION OF AERODYNAMIC VORTICES AND ALSO A REGULATING FLAP AND WING WITH A DEVICE FOR THE GENERATION OF AERODYNAMIC VORTICES

CROSS REFERENCE TO RELATED APPLICATIONS

This application claims priority to PCT Application No. PCT/EP2009/004207, file Jun. 10, 2009; which claims priority to German Patent Application No. DE 102008027618.9, filed Jun. 10, 2008, and claims the benefit to U.S. Provisional Application No. 61/060,210, filed Jun. 10, 2008, the entire disclosures of which applications are hereby incorporated by reference.

BACKGROUND

The invention concerns a device for the generation of aerodynamic vortices and also a regulating flap and wing with a device for the generation of aerodynamic vortices.

Modern commercial aircraft have high-lift aids in order to generate the necessary lift at low speeds during the take-off and landing phases. From the general prior art it is of known art that aerodynamic lifting surfaces such as high-lift systems (high-lift devices) and main and auxiliary aerofoil devices are fitted with wing tips that are cut off straight, or rounded, or with so-called winglets. As a result of the circulation and the pressure adjustment between the lower surface of the wing and the reduced pressure on the upper surface lateral tip vortices of greater vortex strength occur at the wing tips and at the side edges of the high-lift flaps in addition to the vortex layer along the trailing edge of the main wing. These edge vortices that are induced by an aircraft and are a direct result of the circulation generated on the wing, produce an induced resistance, and in the case of large aircraft in particular, as a result of the large angles of attack with which these operate and the auxiliary lifting surfaces that are relatively highly extended in these circumstances, are very strong, long-lived, and have an adverse effect on other aircraft in the pattern flying behind the aircraft in question. This is disadvantageous, since the aim is to minimise the separation between aircraft on the approach to an airport. Particularly with reference to the use of large aircraft the need exists to reduce the time intervals between machines stacked behind one another during takeoff and landing, so as to meet the demands for higher airport passenger and freight handling capacities. The generation of the induced vortices represents a reduction of lift and an increase in resistance, acts as a noise source and in the vicinity of the ground can even cause damage to buildings. The lift distribution is impaired as a result of discontinuities.

From DE 100 20 177 A1 a device for the generation of aerodynamic vortices on the side edge of a high-lift flap of an aircraft is of known art, wherein on the side edge of the regulating flap a vortex generator is formed by a number of elements extending in the spanwise direction; air flows past between these elements on the regulating flap. The elements extending in the spanwise direction are of elongated design and are arranged in shapes similar to that of a comb, which extend over one or a plurality of sections of the profile depth of the regulating flap.

From U.S. Pat. No. 3,596,854 a vortex generator is of known art, which comprises a tubular element extending along the side edge of the regulating flap with an aperture opening out onto the rear side of the regulating flap, by means of which high-pressure air collected on the high-pressure surface of the high-lift flap is outputted. The direction of rotation of the vortex can be selected in the context of an increase or a reduction of the lift force of the high-lift flap.

From WO 03/000547 A1 a winglet for a wing is of known art; this has an arrangement to control the flow so as to reduce the lift generated by means of the winglet as a function of the flight regime in question. For this purpose a flow channel is provided in the winglet, by means of which the upper surface of the winglet can be connected with its lower surface, so as to enable a pressure adjustment and thereby a reduction of the lift generated by the winglet. The flow channel extends in the spanwise direction and terminates within the winglet.

Furthermore from U.S. Pat. No. 6,578,798 B1 a device for the reduction of the resistance of lifting flaps of an aircraft is of known art; the aircraft wing tip has a front and a rear section. The front and rear wing sections are set at different angles relative to the spanwise direction of the wing.

DE 100 52 022 A1 discloses an arrangement for use in turbulent shear layers and vortex structures; this has a multiplicity of flexible hair-shaped structures extending in the flow direction, one end section of these structures being attached to a body wall. The free ends of the hair-shaped structures are aligned by the adjacent flow so as to reduce the vortex generation on objects in the flow field.

SUMMARY OF THE INVENTION

The object of the invention is to provide a device for the generation of aerodynamic vortices to be arranged on a spanwise side edge of a main wing or wing or a regulating flap adjustably arranged on the latter, and also to provide such a regulating flap and a wing with a device for the generation of aerodynamic vortices, which is effective with reference to the increase in lift occurring during take-off and landing of the aircraft, with which the take-off and landing time separations of aircraft at the airport can be minimal, and which can be put into practice with a low level of resource.

These objects are achieved with the features of one or more embodiments disclosed and described herein. Further forms and embodiment are also disclosed and described herein.

The invention is based on the fact that on the ends of the wing or regulating flap in question one or a plurality of aerofoil components of a feather or finger shape are arranged such that these can be retracted and extended on the wing and/or the regulating flap. By means of the at least one aerofoil component provided in accordance with the invention a bundle of tip vortices is generated instead of one lateral induced tip vortex; these form a vortex coil exiting from the regulating flap, or the wing or main wing. This is composed of a multiplicity of individual vortices, which dissipate rapidly and reduce the resistance while the lift remains the same. The greatest advantage derives from the alteration of the induced resistance and the increase of the dissipation. The decomposition of the previous central tip vortex into a vortex coil reduces the life and circumferential velocity of the vortex as a result of increased dissipation. In this manner the minimum separation distances between aircraft flying one behind another can be reduced. Furthermore the ratio of lift to resistance is significantly improved. Moreover improvements ensue regarding the regulation of the load distribution on the wing, the control of gusts and the controllability of the flight dynamics, as a result of an improved effective lever arm achieved by the extension of the at least one aerofoil component. Faster decomposition of the tip vortex and greater vortex dissipation furthermore takes place by means of the invention.

In accordance with the invention a device is in particular provided for the generation of aerodynamic vortices to be arranged on a spanwise side edge of a main wing or wing or a movable flap adjustably arranged on the latter, which in each case have a chordwise direction and a spanwise direction. Here the device for vortex generation can have one or two aerofoil components, wherein:

the at least one aerofoil component is designed as a part that can be moved relative to the wing or regulating flap in their spanwise direction, on the respective spanwise edge of the wing or regulating flap a recess is designed for accommodation of the aerofoil components, and the device for vortex generation has an actuation device for retraction and extension of the aerofoil component into the recess, and also a drive device to operate the actuation device.

The device for vortex generation can in particular be formed from a plurality of aerofoil components, and configured such that the aerofoil components are designed as parts that can be moved relative to the wing or regulating flap in their spanwise direction and relative to one another; in the extended state of the aerofoil components the outer end sections of these parts are spaced apart from one another in the direction of the wing or regulating flap thickness. Here provision is made that on the respective spanwise edge of the wing or regulating flap a recess is designed for accommodation of the aerofoil components, and the device for vortex generation has an actuation device for retraction and extension of the aerofoil components into the recess, and also a drive device to operate the actuation device. Here provision can be made that in its retracted state the at least one aerofoil component is situated completely within the contour of the wing or regulating flap, or that sections of the at least one aerofoil component are situated within the contour of the wing or regulating flap.

Furthermore the device for vortex generation can be configured such that the outer end sections of the aerofoil components in their extended state are spaced apart from one another in the thickness direction of the wing or regulating flap, and/or the outer end sections of the aerofoil components in their extended state are spaced apart from one another as seen in the chordwise direction of the wing or regulating flap thickness.

The aerofoil components can be guided by the actuation device such that in the extended state of the aerofoil components the end sections at the outer ends of the same are situated one behind another in the chordwise direction of the wing or regulating flap. The aerofoil components can in particular be guided by the actuation device such that in the extended state of the aerofoil components end sections of the same are situated one above another in the chordwise direction of the wing or regulating flap.

The actuation device can have a linear guidance device for the linear retraction and extension of the at least one aerofoil component, or can be designed as such. Here the linear guidance device can have slider-track kinematics. The aerofoil components can be guided by the linear guidance device such that in the extended state of the aerofoil components end sections of the same are situated one behind another in the chordwise direction of the wing or regulating flap.

Alternatively the actuation device can have a rotational mounting device, on which the at least one aerofoil component is supported such that it can rotate between the retracted and extended positions. If a plurality of aerofoil components is used these can be arranged on the same axis of rotation. Alternatively each of the plurality of aerofoil components can be arranged on its own axis of rotation.

In the forms of embodiment cited a drive device can in each case be provided for each aerofoil component.

In accordance with the invention a regulating flap of a wing is furthermore provided with a device for the generation of aerodynamic vortices to be arranged on the spanwise side edge of the regulating flap, wherein the device for vortex generation is formed with one or a plurality of aerofoil components in one of the examples of embodiment cited. The regulating flap can in particular be a high-lift flap of a wing.

The actuation device of the device for vortex generation can have slider-track kinematics for the linear retraction and extension of the aerofoil components, or a rotational mounting device, on which the aerofoil components are supported between the retracted and extended positions. The actuation device for the positioning of the aerofoil components can in particular be configured such that the positioned states of the at least one aerofoil component are coupled with the positioned state of the regulating flap, wherein in a retracted state of the regulating flap the at least one aerofoil component is located in a retracted state, and wherein in an extended state of the regulating flap the at least one aerofoil component is located in an extended state. Here the actuation device can in particular be configured such that in positioned states of the regulating flap within a range of adjustment with lesser extended positions at least one of the aerofoil components is extended, and that in positioned states of the regulating flap within a range of adjustment with greater extended positions at least one other of the aerofoil components is extended. The range of adjustment with lesser extended positions can lie between 0% and 50% of the full range of extension of the regulating flap. For purposes of coupling the positioned states of the aerofoil components with the positioned state of the regulating flap a mechanical coupling device can be provided.

In accordance with the invention a feedback mechanism can furthermore be arranged on the regulating flap, or integrated in the latter, which mechanically couples the extended position of the regulating flap with the extended states of the aerofoil components. Here an activation device can furthermore be provided, which activates the feedback mechanism if the regulating flap is retracted. The feedback mechanism can be functionally coupled with flap-positioning kinematics mechanically, or in another manner, so that the positioning track or the positioned state of the flap-positioning kinematics is used by the feedback mechanism to adjust the extended position of the at least one aerofoil component or individual aerofoil components. When a plurality of aerofoil components is used the drive device of each individual aerofoil component can be coupled with the flap-positioning kinematics mechanism mechanically, or in another manner, or the drive devices of the aerofoil components can be coupled with one another, so that only one of the drive devices of the aerofoil components is coupled with the flap-positioning kinematics mechanism to adjust the extended states of a plurality of aerofoil components.

In a further example of embodiment the actuation device can have a control module to actuate the drive device of the actuation device, which control module is functionally connected with a flight control device for the whole aircraft, and has a function for the reception of command signals for the drive device of the actuation device to operate the same.

Furthermore in accordance with the invention a wing or a main wing for an aircraft is provided, which at its spanwise end has a device for the generation of aerodynamic vortices in accordance with one of the previously cited examples of embodiment. The actuation device of the device for vortex generation can have slider-track kinematics, or a rotational mounting device. A regulating flap can in particular be arranged on the wing in accordance with one of the previously cited examples of embodiment. In particular the actuation device for the positioning of the aerofoil components can be configured such that the positioned states of the aerofoil components are coupled with the positioned state of the regulating flap, wherein in a retracted state of the regulating flap the aerofoil components are located in a retracted state, and in an extended state of the regulating flap the aerofoil components are located in an extended state. In accordance with a further example of embodiment the actuation device can be configured such that in positioned states of the regulating flap within a range of adjustment with lesser extended positions at least one of the aerofoil components is extended, and that in positioned states of the regulating flap within a range of adjustment with greater extended positions at least one other of the aerofoil components is extended, so that a passive positioning of the aerofoil components is achieved as a result of the position of the regulating flap. Here the range of adjustment with lesser extended positions can lie between 0% and 50% of the full range of extension of the regulating flap. For purposes of coupling the positioned states of the aerofoil components with the positioned state of the regulating flap a mechanical coupling device can be provided. On the regulating flap a feedback mechanism can be arranged and/or integrated in accordance with one of the previously cited forms of embodiment, in particular so as to couple the extended positions of the regulating flap mechanically with the extended states of the aerofoil components. Furthermore an activation device can be arranged and/or integrated, which activates the feedback mechanism if the regulating flap is retracted.

The actuation device can also have a control module to activate the drive device of the actuation device, which control module is functionally connected with a flight control device for the whole aircraft, and has a function for the reception of command signals from the flight control device, and for the generation of command signals for the drive device of the actuation device to operate the same. By this means an active positioning of the aerofoil components is undertaken.

In accordance with the invention a wing is also provided, which has at least two aerofoil segments on its side edge situated at the spanwise end. Here furthermore:

the aerofoil segments as seen in the spanwise direction are situated in each case one behind another and behind the wing; their outer contour is formed such that it continues the contour of the main wing in the spanwise direction to form a complete wing, wherein the aerofoil segments are supported such that they can rotate on a common axis of rotation, and each segment is coupled in each case with a drive device, with which each segment can in each case be positioned independently of the other segments.

The majority of segments can also be arranged on a regulating flap and in particular on a high-lift flap. In accordance with the invention a regulating flap is accordingly also provided, which has at least two aerofoil segments on at least one side edge of its spanwise ends, wherein:

the aerofoil segments as seen in the spanwise direction are situated in each case one behind another and behind the regulating flap; their outer contour is formed such that this continues the contour of the main wing in the spanwise direction to form a complete wing, wherein the aerofoil segments are supported such that they can rotate on a common axis of rotation, and each segment is coupled in each case with a drive device, with which each segment can in each case be positioned independently of the other segments.

BRIEF DESCRIPTION OF THE DRAWINGS

In what follows examples of embodiment of the invention are elucidated with the aid of the drawing. In the figures.

DETAILED DESCRIPTION OF THE INVENTION

Figure 1:
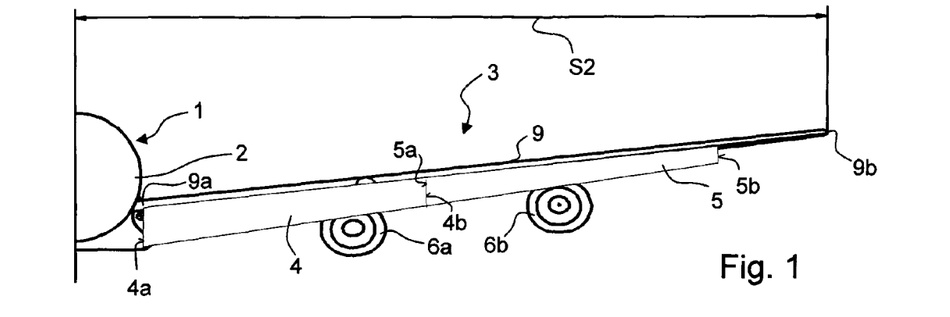
FIG. 1 shows a wing of an aircraft as seen from the rear, i.e. in the direction of flight, with an inner and an outer high-lift flap, in each case in its extended state, wherein no aerofoil components provided in accordance with the invention are arranged on the wing as represented.

FIG. 1 shows an aircraft 1 with a fuselage 2 and a wing 3 as seen from the rear and in the direction of flight, or along the longitudinal axis of the aircraft. In this viewing direction the right-hand of the two wings of the aircraft is thus shown with the half span width S2. On the main wing 9 of the wing 3 as shown are represented an inner 4 and an outer 5 high-lift flap, in each case in its extended state, and also two engine nacelles 6a, 6b. The inner and the outer high-lift flap 4, 5 have in each case an inner end 4a and 5a respectively, facing towards the fuselage 2 and an outer end 4b, 5b respectively, facing away from the fuselage 2, or facing towards the wing tip. Likewise the main wing 9 has an outer end 9b, situated opposite to the fuselage-side end 9a of the main wing 9. In this context the term "end" is used for the spanwise side edge of the contour of the high-lift flap 4, 5, or of the main wing 9, respectively.

Figure 2:
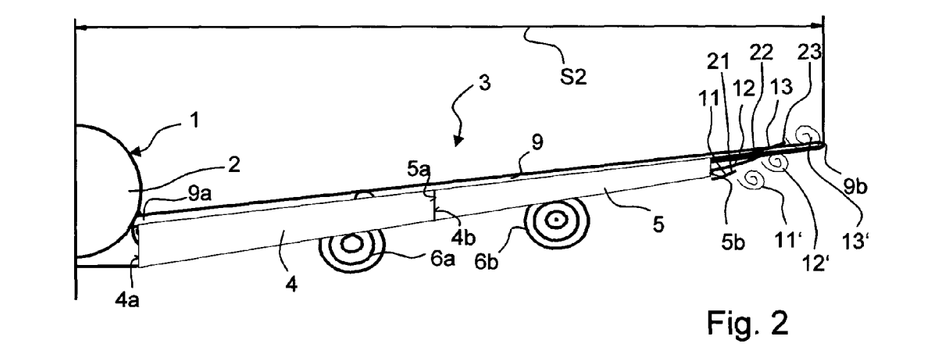
FIG. 2 shows the wing with extended high-lift flaps in the representation of FIG. 1, wherein a form of embodiment of the aerofoil components in accordance with the invention is arranged in the outer edge region of the outer high-lift flap.
Figure 3:
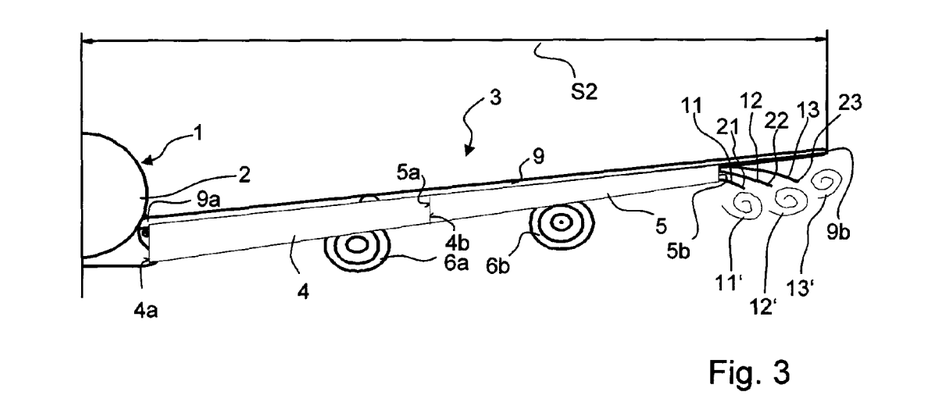
FIG. 3 shows the wing with extended high-lift flaps in the representation of FIG. 1, wherein a further form of embodiment of the aerofoil components in accordance with the invention is arranged in the outer edge region of the outer high-lift flap.
Figure 4:
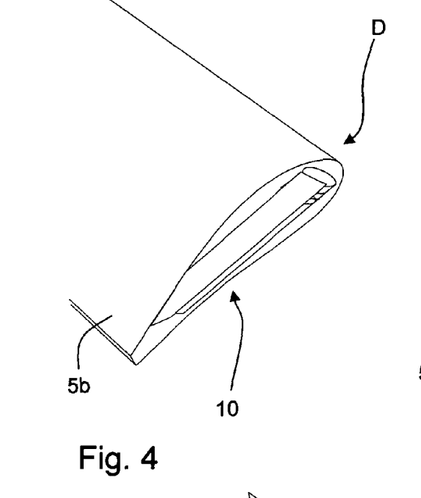
FIG. 4 shows a lateral end section of a high-lift flap with a form of embodiment of the device for vortex generation in accordance with the invention, in which three aerofoil components are provided, and the aerofoil components are supported by means of a rotational mounting device such that they can rotate on the same axis of rotation between the retracted position and the extended position, wherein the aerofoil components are located in a retracted state.
Figure 5:
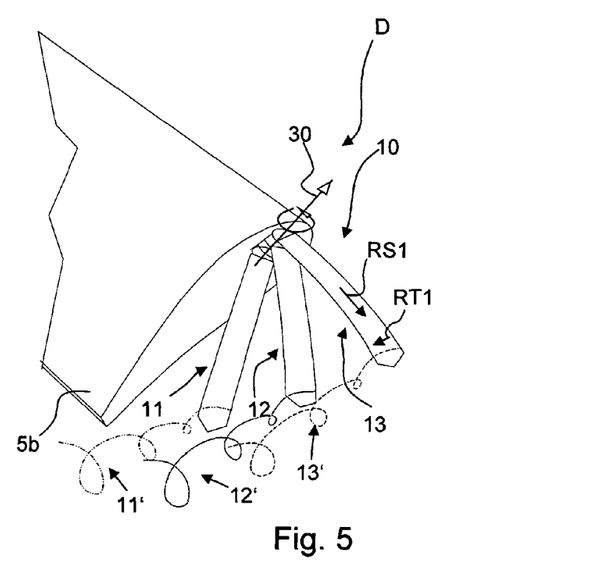
FIG. 5 shows the lateral end section of a high-lift flap with the form of embodiment of the device for vortex generation in accordance with the invention in accordance with FIG. 4, wherein the aerofoil components are located in an extended state.
Figure 6:
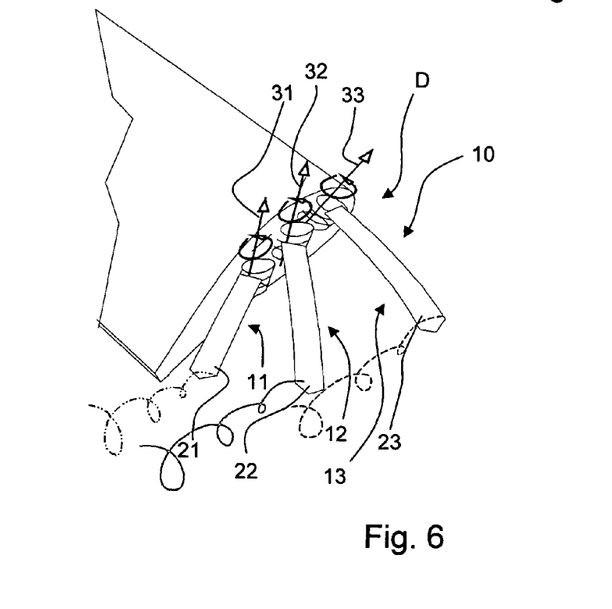
FIG. 6 shows a lateral end section of a high-lift flap with a further form of embodiment of the device for vortex generation in accordance with the invention, in which three aerofoil components are provided, and the aerofoil components are supported by means of a rotational mounting device such that each can rotate on its own axis of rotation between the retracted position and the extended position, wherein the aerofoil components are located in an extended state.
Figure 7:
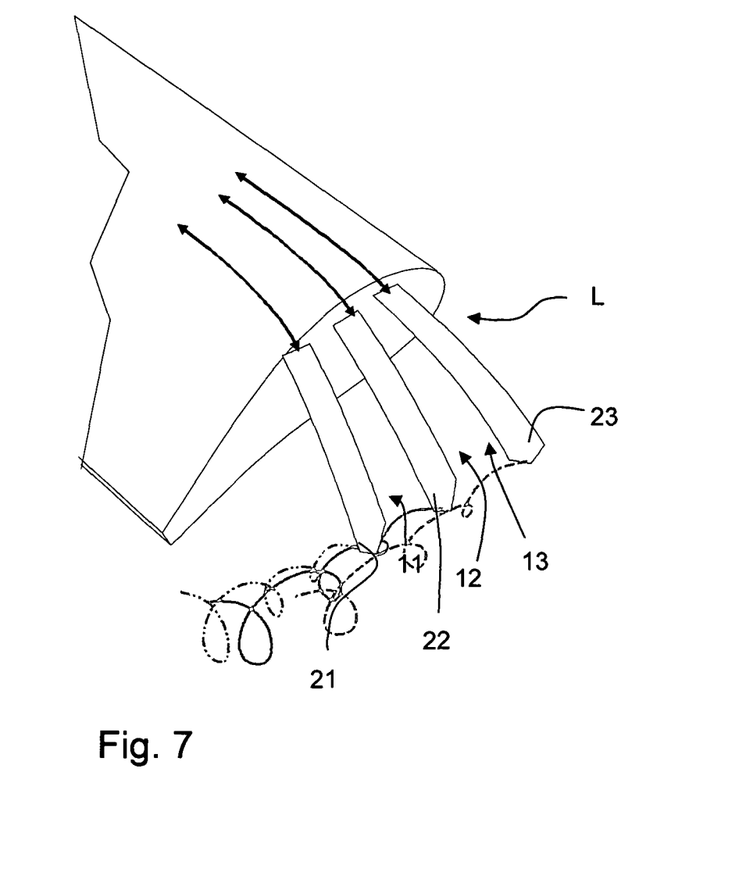
FIG. 7 shows a lateral end section of a high-lift flap with a further form of embodiment of the device for vortex generation in accordance with the invention, in which three aerofoil components are provided, and in which the aerofoil components are supported by means of a linear guidance device such that they can move between the retracted position and the extended position, wherein the aerofoil components are located in an extended state.
Figure 8:
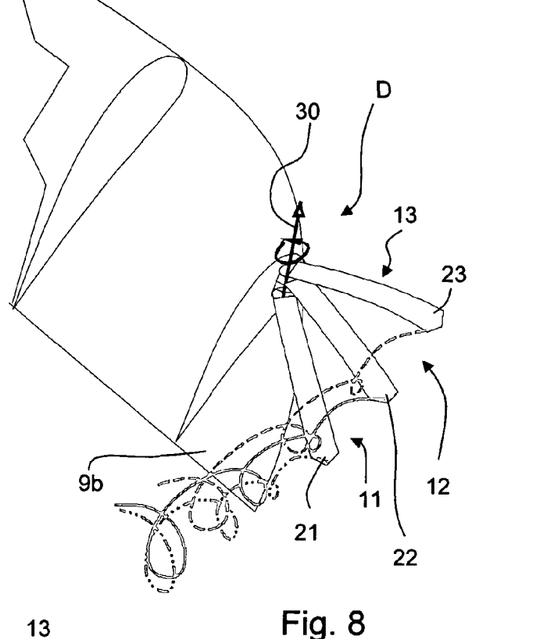
FIG. 8 shows a lateral end section of a main wing, on which is arranged a form of embodiment of the device for vortex generation in accordance with the invention with three aerofoil components; the aerofoil components are supported by means of a rotational mounting device such that they can move between the retracted position and the extended position, wherein the aerofoil components are located in an extended state.
Figure 9:
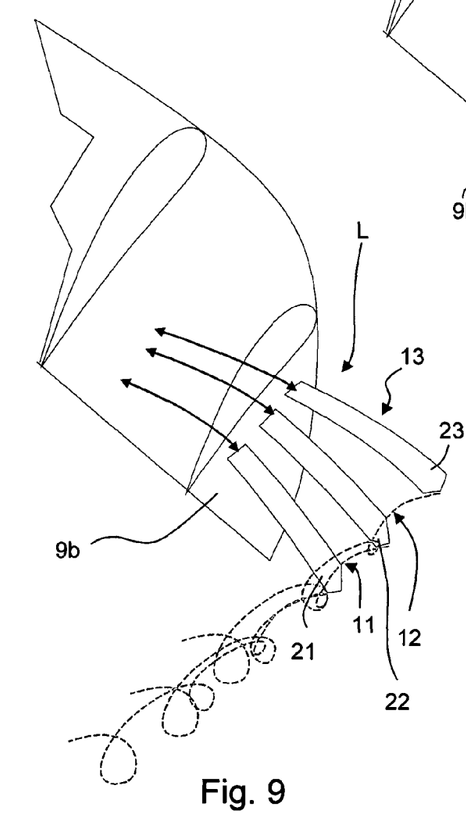
FIG. 9 shows a lateral end section of a main wing, on which is arranged a form of embodiment of the device for vortex generation in accordance with the invention with three aerofoil components; the aerofoil components are supported by means of a linear guidance device such that they can move between the retracted position and the extended position, wherein the aerofoil components are located in an extended state.

In accordance with the invention a device 10 for the generation of aerodynamic vortices is arranged on the spanwise side edge of a wing, or on a regulating flap adjustably arranged on the latter, which in particular can be a high-lift flap 4, 5, the device being formed from at least one aerofoil component 11, 12, 13. In FIGS. 2 to 7 aerofoil components 11, 12, 13 are represented in an exemplary manner as on a high-lift flap, namely on its edge region 5b facing towards the wing tip. The device for vortex generation in accordance with the invention can alternatively or additionally be arranged on any type of regulating flap, and thereby on its inner and/or outer edge region. In FIGS. 2 and 3 vortices leaving the aerofoil components 11, 12, 13 are symbolically represented and provided with the reference symbols 11', 12', 13'. The aerofoil components are feather-like flow bodies with an aerodynamic profile, which has a spanwise direction RS1 and an aerofoil chordwise direction RT1 (FIG. 5). The aerofoil components have an aerofoil shape and are preferably formed in an elongated manner in the spanwise direction RS1. As seen in the spanwise direction RS1 the aerofoil components 11, 12, 13 can be of a straight or curved shape.

In FIGS. 2 to 9 the devices 10 for vortex generation represented there are in each case three aerofoil components, which are provided with the same reference symbols, even when these belong to different forms of embodiment.

In FIGS. 2 to 9 the device 10 for vortex generation is in each case represented with three aerofoil components 11, 12, 13. In general the device 10 for the generation of aerodynamic vortices in accordance with the invention can also be formed from just one aerofoil component. In the formation of the device 10 from one aerofoil component this is designed as a part that can be moved relative to the wing or regulating flap in its spanwise direction. If the device 10 for vortex generation is formed from a plurality of aerofoil components 11, 12, 13 the device 10 is configured such that the aerofoil components 11, 12, 13 are designed as parts that can be moved relative to the wing or regulating flap in their spanwise direction, whose outer end sections in the extended state of the aerofoil components are spaced apart from one another in the thickness direction of the wing or regulating flap, and such that on the respective spanwise edge of the wing or regulating flap a recess is designed to accommodate the aerofoil components, and the device 10 for vortex generation has an actuation device for the retraction and extension of the aerofoil components into the recess, and also a drive device to operate the actuation device. Here the device 10 for vortex generation can in particular be configured such that the outer end sections of the aerofoil components in their extended state are spaced apart from one another in the thickness direction of the wing or regulating flap, and/or the outer end sections of the aerofoil components in their extended state are spaced apart from one another as seen in the chordwise direction of the wing or regulating flap.

The device 10 for vortex generation and/or the regulating flap 4, 5 or the main wing 9 has an actuation device for the retraction and extension of the one aerofoil component or aerofoil components, which are driven, i.e. operated, by a drive device (not shown). The actuation device has in particular positioning kinematics and a guidance device, by means of which the retraction and extension movement of the aerofoil component or aerofoil components 11, 12, 13 is determined. The actuation device can in particular have a linear guidance device, in particular in the form of slider-track kinematics, for the linear retraction and extension of the at least one aerofoil component or aerofoil components 11, 12, 13. Alternatively the actuation device can have a rotational mounting device D, on which the at least one aerofoil component or aerofoil components 11, 12, 13 is/are supported such that it/they can rotate between the retracted and extended positions. Rotation may take place about a common axis of rotation 30, or respective axes of rotation 31, 32, 33.

In the formation of the device 10 for vortex generation from a plurality of aerofoil components 11, 12, 13 these can be guided by the linear guidance device or by the rotational mounting device such that in the extended state of the aerofoil components 11, 12, 13 end sections 21, 22, 23 of the same are situated one behind another in the chordwise direction of the wing or regulating flap, as represented in FIGS. 5 to 9. Furthermore these in their partially or fully extended state starting from the respective end or edge region of the regulating flap 4, 5 or of the main wing 9 can extend in their spanwise direction RS1 upwards (FIG. 2) or downwards (FIG. 3). Furthermore provision can be made that the outer end sections 21, 22, 23 of the aerofoil components 11, 12, 13 in their partially or fully extended state are spaced apart from one another in the thickness direction of the wing or regulating flap, as shown in FIGS. 2 and 3. Furthermore the device 10 for the generation of aerodynamic vortices can be designed, and the aerofoil components 11, 12, 13 can be guided by the actuation device, such that in the fully or partially extended state of the aerofoil components 11, 12, 13 the end sections 21, 22, 23 or outer ends of the aerofoil components are situated one behind another (FIGS. 5 to 9) and/or one above another (FIGS. 5, 6 and 8) in the chordwise direction of the wing or regulating flap.

The main wing 9 and/or the regulating flap 4, 5 on which the device 10 is arranged can have a depression or a cavity or a recess into which the aerofoil components 11, 12, 12 can be retracted.

The actuation device for the positioning of the aerofoil components 11, 12, 13 can be configured such that the positioned states of the at least one aerofoil component 11, 12, 13 are coupled with the positioned state of the regulating flap 4, 5, wherein in a retracted state of the regulating flap 4, 5 the at least one aerofoil component 11, 12, 13 is located in a retracted state, and wherein in an extended state of the regulating flap 4, 5 the at least one aerofoil component 11, 12, 13 is located in an extended state.

Here the actuation device can furthermore be configured such that in positioned states of the regulating flap within a range of adjustment with lesser extended positions at least one of the aerofoil components 11, 12, 13 is extended, and that in positioned states of the regulating flap within a range of adjustment with greater extended positions at least one other of the aerofoil components 11, 12, 13 is extended. In this form of embodiment of the device 10 a passive extension and retraction of the at least one aerofoil component is implemented. For purposes of coupling the positioned states of the aerofoil components 11, 12, 13 with the positioned state of the regulating flap 4, 5 a mechanical coupling device can be provided.

In a further form of embodiment of the device 10 for vortex generation in accordance with the invention, a feedback mechanism can be arranged on the regulating flap 4, 5, which mechanically couples the extended position of the regulating flap 4, 5 with the extended states of the aerofoil components 11, 12, 13. Here an activation device is furthermore provided, which activates the feedback mechanism if the regulating flap 4, 5 is retracted.

In a further form of embodiment of the device 10 for vortex generation in accordance with the invention, provision can be made that the actuation device has a control module to actuate the drive device of the actuation device, which is functionally connected with a flight control device for the whole aircraft, and which has a function for the reception of command signals for the drive device of the actuation device to operate the same. In this manner an active positioning of the at least one aerofoil component 11, 12, 13 is implemented.

In accordance with a further form of embodiment of the invention a wing or a main wing 9 is provided, which at its side edge situated at the spanwise end has at least two aerofoil segments 51, 52, wherein:

the aerofoil segments 51, 52 as seen in the spanwise direction are situated in each case one behind another and behind the wing and their outer contour is formed such that this continues the contour of the main wing in the spanwise direction to form a complete wing, wherein the aerofoil segments 51, 52 are supported such that they can rotate on a common axis of rotation 53, and each segment 51, 52 is coupled in each case with a drive device, with which each segment can in each case be positioned independently of the other segments.

Figure 10:
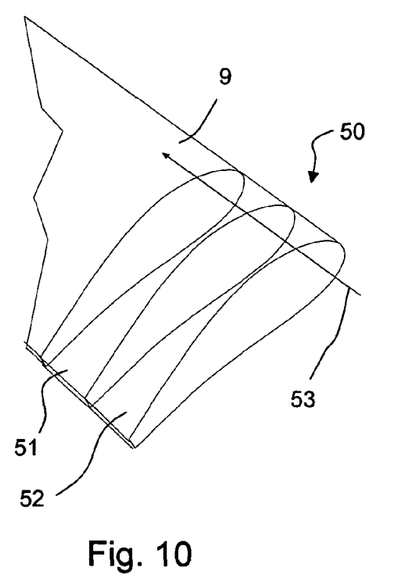
FIG. 10 shows a lateral end section of a main wing, on which is arranged a form of embodiment of the device for vortex generation in accordance with the invention with two aerofoil segments, which are supported such that they can rotate on a common axis of rotation, wherein the aerofoil segments are located in an initial position, or a neutral positioned state.
Figure 11:
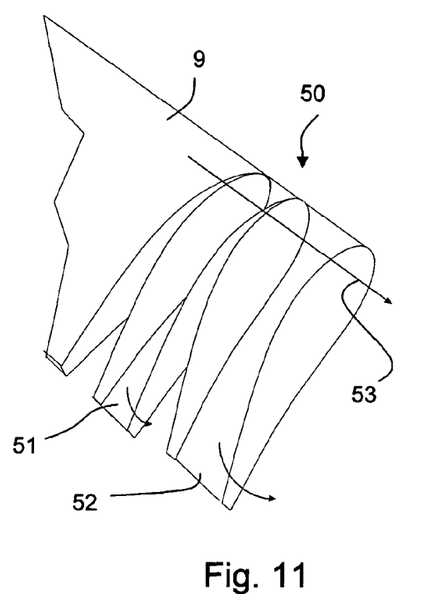
FIG. 11 shows the lateral end section of a high-lift flap with the form of embodiment of the device for vortex generation in accordance with the invention in accordance with FIG. 10, wherein the segments are located in a first positioned state.
Figure 12:
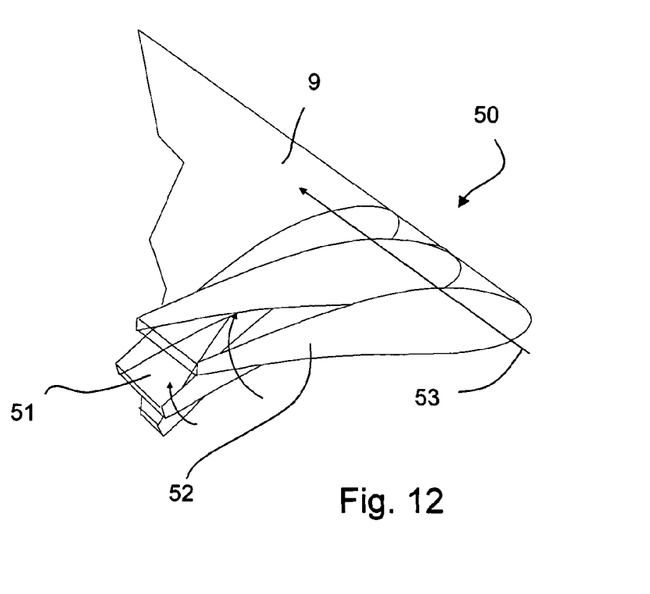
FIG. 12 shows the lateral end section of the main wing with the form of embodiment of the device for vortex generation in accordance with the invention in accordance with FIG. 10, wherein the segments are located in a further setting state.

FIG. 10 shows a lateral end section of a main wing 9, on which a form of embodiment of the device 50 for vortex generation in accordance with the invention is arranged with two aerofoil segments 51, 52, which are supported such that they can rotate on a common axis of rotation 53, wherein the aerofoil segments are located in an initial position or in a neutral positioned state. FIG. 11 shows the segments 51, 52 in a further positioned state and FIG. 12 shows the segments 51, 52 in a further positioned state.

In an analogous manner the previously described arrangement of aerofoil segments can also be arranged on a regulating flap, and in particular on a high-lift flap. In accordance with the invention therefore a regulating flap is also provided, which on at least one side edge of its spanwise ends has at least two aerofoil segments. Here the aerofoil segments 51,52 as seen in the spanwise direction are in each case situated one behind another and behind the regulating flap 4, 5. Their outer contour is formed such that this continues the contour of the main wing in the spanwise direction to form a complete wing, wherein the aerofoil segments 51, 52 are supported such that they can rotate on a common axis of rotation 53. Furthermore each segment 51, 52 is thereby coupled in each case with a drive device, with which each segment 51, 52 can be positioned independently of each of the other segments 52, 51.

The invention claimed is:

1. An apparatus, comprising:
   a regulating flap for a wing of an aircraft having a thickness in a direction of airflow, a spanwise side edge, and a recess in the spanwise side edge;
   a plurality of aerofoil components adjustably arranged on the spanwise side edge of the regulating flap;
   an actuation device coupled to the plurality of aerofoil components and operating to: (i) extend and retract the aerofoil components out of and into the recess in a spanwise direction of the regulating flap, (ii) move the plurality of aerofoil components relative to one another, and (iii) extend the plurality of aerofoil components out of the recess such that respective outer end sections of the plurality of aerofoil components are spaced apart from one another in the thickness direction of the regulating flap; and
   at least one drive device to operate the actuation device.

2. The apparatus in accordance with claim 1, wherein the outer end sections of the aerofoil components in their extended state are spaced apart from one another in a chordwise direction of the regulating flap.

3. The apparatus in accordance with claim 1, wherein the aerofoil components in their retracted state are situated completely within a contour of the regulating flap.

4. The apparatus in accordance with claim 1, wherein some sections of the aerofoil components in their retracted state are situated within a contour of the regulating flap.

5. The apparatus in accordance with claim 1, wherein the aerofoil components are guided by the actuation device such that in the extended state of the aerofoil components the outer end sections are situated one behind another in a chordwise direction of the regulating flap.

6. The apparatus in accordance with claim 1, wherein the aerofoil components are guided by the actuation device such that in the extended state of the aerofoil components the outer end sections are situated one above another in a chordwise direction of the regulating flap.

7. The apparatus in accordance with claim 1, wherein the actuation device has a rotational mounting device, on which the aerofoil components are supported such that they rotate between the retracted position and the extended position.

8. The apparatus in accordance with claim 7, wherein the rotational mounting device is designed such that the plurality of aerofoil components are arranged on a common axis of rotation.

9. The apparatus in accordance with claim 7, wherein the rotational mounting device is designed such that each of the plurality of aerofoil components is arranged on a respective axis of rotation.

10. The apparatus in accordance with claim 1, wherein the at least one drive device includes a respective drive device for each aerofoil component.

11. The apparatus in accordance with claim 1, wherein the regulating flap is a high-lift flap of the wing.

12. The apparatus in accordance with claim 1, wherein the actuation device has a rotational mounting device, on which the aerofoil components are supported such that they rotate between the retracted and the extended positions, the regulating flap has on its outer edge a pocket, in which the aerofoil components in their retracted state are accommodated.

13. The apparatus in accordance with claim 1, wherein the actuation device is configured such that one or more positions of the aerofoil components are coupled with one or more positions of the regulating flap, wherein in a retracted state of the regulating flap the airfoil components are located in a retracted state, and wherein in an extended state of the regulating flap the airfoil components are located in an extended state.

14. The apparatus in accordance with claim 13, wherein the actuation device is configured such that in one or more positions of the regulating flap within a range of adjustment with lesser extended positions at least one of the aerofoil components is extended, and that in one or more positions of the regulating flap within a range of adjustment with greater extended positions at least one other of the aerofoil components is extended.

15. The apparatus in accordance with claim 14, wherein the range of adjustment with lesser extended positions lies between 0% and 50% of a complete range of extension of the regulating flap.

16. The apparatus in accordance with claim 13, wherein a mechanical coupling device is provided for purposes of coupling the one or more positions of the aerofoil components with the one or more positions of the regulating flap.

17. The apparatus in accordance with claim 13, further comprising:
- a feedback mechanism arranged on the regulating flap, which mechanically couples the extended position of the regulating flap with the aerofoil components in extended states, and
- an activation device, which activates the feedback mechanism if the regulating flap is retracted.

18. The apparatus in accordance with claim 13, further comprising a control module to actuate the at least one drive device, which control module is functionally connected with a flight control device for the aircraft, and which has a function for the reception of command signals for the at least one drive device to operate the actuation device.

\* \* \* \* \*